US009255990B2

(12) United States Patent
Song et al.

(10) Patent No.: US 9,255,990 B2
(45) Date of Patent: Feb. 9, 2016

(54) METHOD AND APPARATUS FOR GENERATING VOLUME IMAGE

(71) Applicant: SAMSUNG MEDISON CO., LTD., Gangwon-Do (KR)

(72) Inventors: Joo-Hyun Song, Gangwon-do (KR); Jin-Yong Lee, Gangwon-do (KR)

(73) Assignee: SAMSUNG MEDISON CO., LTD., Hongcheon-gun, Gangwon-do (KR)

( * ) Notice: Subject to any disclaimer, the term of this patent is extended or adjusted under 35 U.S.C. 154(b) by 366 days.

(21) Appl. No.: 13/892,862

(22) Filed: May 13, 2013

(65) Prior Publication Data

US 2013/0301381 A1 Nov. 14, 2013

(30) Foreign Application Priority Data

May 14, 2012 (KR) ........................ 10-2012-0051064

(51) Int. Cl.
*G03B 42/06* (2006.01)
*G01S 15/89* (2006.01)
*G06T 15/08* (2011.01)

(52) U.S. Cl.
CPC ............. *G01S 15/8995* (2013.01); *G06T 15/08* (2013.01); *G06T 2207/10136* (2013.01)

(58) Field of Classification Search
CPC ..................... G06T 15/08; G06T 2207/10136; G01S 15/8995
USPC ............................................................ 367/7
See application file for complete search history.

(56) References Cited

U.S. PATENT DOCUMENTS

| 6,775,405 B1* | 8/2004 | Zhu ................................ 382/154 |
| 2007/0179377 A1* | 8/2007 | Carlsen et al. ................. 600/407 |
| 2008/0037843 A1 | 2/2008 | Fu et al. |

FOREIGN PATENT DOCUMENTS

| EP | 2 189 812 A1 | 5/2010 |
| JP | 2009-112468 A | 5/2009 |
| JP | 2009-131420 | 6/2009 |
| JP | 2011-156286 | 8/2011 |
| WO | 2010/015957 A1 | 2/2010 |

OTHER PUBLICATIONS

Extended European Search Report issued in European Patent Application No. EP 13164033.6 dated Oct. 1, 2013.

(Continued)

*Primary Examiner* — Mark Hellner
(74) *Attorney, Agent, or Firm* — McDermott Will & Emery LLP (57) ABSTRACT

A volume image generating method including transmitting an ultrasonic signal to a target body divided into a plurality of regions and generating a first sub-volume image corresponding to a first region from among the plurality of regions of the target body, based on a response signal reflected from the target body; generating a second sub-volume image corresponding to a second region contacting the first region from among the plurality of regions; connecting the second sub-volume image to the first sub-volume image according to a location relationship between the first region and the second region of the target body; and re-generating the second sub-volume image based on a concordance rate between sectional images of the first and second sub-volume images that contact each other, and connecting the re-generated second sub-volume image to the first sub-volume image.

15 Claims, 5 Drawing Sheets

(56) References Cited

OTHER PUBLICATIONS

S. Brekke et al., "Real-time volume stitching in 4D echocardiography," 2005 IEEE Ultrasonics Symposium; pp. 1228-1231; XP010899047.

Korean Notice of Allowance, w/ English translation thereof, issued in Korean Patent Application No. KR 10-2012-0051064 dated Oct. 7, 2013.

Korean Office Action, w/ English translation thereof, issued in Korean Patent Application No. KR 10-2012-0051064 dated Feb. 28, 2013.

* cited by examiner

METHOD AND APPARATUS FOR GENERATING VOLUME IMAGE

CROSS-REFERENCE TO RELATED PATENT APPLICATION

This application claims the benefit of Korean Patent Application No. 10-2012-0051064, filed on May 14, 2012, in the Korean Intellectual Property Office, the disclosure of which is incorporated herein in its entirety by reference.

BACKGROUND OF THE INVENTION

1. Field of the Invention

The present invention relates to a method and apparatus for generating a volume image of a target body. More particularly, the present invention relates to a method and apparatus for generating a volume image by connecting sub-volume images of a target body to one another.

2. Description of the Related Art

Ultrasonic apparatuses are equipment for observing the interior structure of an organic body. Ultrasonic apparatuses are noninvasive inspecting apparatuses, and show structural details and interior tissue of a body and the flow of a fluid in the body.

Ultrasonic apparatuses acquire an image of an interior structure of a target body by transmitting an ultrasonic signal to the target body and receiving a response signal reflected from the target body.

Ultrasonic apparatuses may generate a volume image, that is, a three-dimensional (3D) image, of a target body, and an examiner may inspect the target body three-dimensionally via the volume image.

SUMMARY OF THE INVENTION

The present invention provides generation of a reliable volume image due to effective removal of stitch artifacts included in a volume image of a target body.

According to an aspect of the present invention, there is provided a volume image generating method including transmitting an ultrasonic signal to a target body divided into a plurality of regions and generating a first sub-volume image corresponding to a first region from among the plurality of regions of the target body, based on a response signal reflected from the target body; generating a second sub-volume image corresponding to a second region contacting the first region from among the plurality of regions; connecting the second sub-volume image to the first sub-volume image according to a location relationship between the first region and the second region of the target body; and re-generating the second sub-volume image based on a concordance rate between sectional images of the first and second sub-volume images that contact each other, and connecting the re-generated second sub-volume image to the first sub-volume image.

The volume image generating method may further include, when the concordance rate between the sectional images of the first and second sub-volume images that contact each other exceeds a preset value, generating a third sub-volume image corresponding to a third region contacting the second region from among the plurality of regions of the target body and connecting the third sub-volume image to the re-generated second sub-volume image.

The connecting of the re-generated second sub-volume image to the first sub-volume image may include automatically re-generating the second sub-volume image when the concordance rate is less than the preset value.

The volume image generating method may further include generating sub-volume images respectively corresponding to the plurality of regions and connecting the sub-volume images to one another to generate a volume image of the target body.

The connecting of the re-generated second sub-volume image to the first sub-volume image may include acquiring the concordance rate between the sectional images of the first and second sub-volume images that contact each other, by using a SSD, a CC, or MI.

The volume image generating method may further include displaying a first figure corresponding to the generated first sub-volume image; and connecting a second figure corresponding to the generated second sub-volume image to the first figure according to a location relationship between the first region and the second region of the target body and displaying the connected first and second figures.

The volume image generating method may further include mapping the concordance rate between the sectional images of the first and second sub-volume images that contact each other with a color scale and displaying a result of the mapping on the second figure.

According to another aspect of the present invention, there is provided a volume image generating apparatus including a probe which transmits an ultrasonic signal to a target body divided into a plurality of regions and receives a response signal reflected from the target body; and an image control unit which generates a first sub-volume image and a second sub-volume image corresponding respectively to a first region and a second region contacting the first region, from among the plurality of regions based on the response signal, and connects the second sub-volume image to the first sub-volume image according to a location relationship between the first region and the second region, wherein the image control unit re-generates the second sub-volume image based on a concordance rate between sectional images of the first and second sub-volume images that contact each other, and connects the re-generated second sub-volume image to the first sub-volume image.

When the concordance rate between the sectional images of the first and second sub-volume images that contact each other exceeds a preset value, the image control unit may generate a third sub-volume image corresponding to a third region contacting the second region from among the plurality of regions and connect the third sub-volume image to the re-generated second sub-volume image.

The image control unit may generate sub-volume images respectively corresponding to the plurality of regions and connect the sub-volume images to one another to generate a volume image of the target body.

When the concordance rate is less than the preset value, the image control unit may automatically re-generate the second sub-volume image.

The image control unit may acquire the concordance rate between the sectional images of the first and second sub-volume images that contact each other, by using an SSD, a CC, or MI.

The volume image generating apparatus may further include a display unit which displays a first figure corresponding to the generated first sub-volume image, connects a second figure corresponding to the generated second sub-volume image to the first figure according to a location relationship between the first region and the second region, and displays the connected first and second figures.

The display unit may map the concordance rate between the sectional images of the first and second sub-volume images that contact each other with a color scale and display a result of the mapping on the second figure.

According to another aspect of the present invention, there is provided a computer-readable recording medium having recorded thereon a program for executing the volume image generating method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Merits and features of the present invention, and a method for accomplishing the merits and features will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. The scope of the invention is defined not by the detailed description of the invention but by the appended claims. Like reference numerals in the drawings denote like elements.

The terms "unit" as used herein may refer to, but is not limited to, a software or hardware component, such as a Field Programmable Gate Array (FPGA) or Application Specific Integrated Circuit (ASIC), which performs certain tasks. A unit may be configured to reside on an addressable storage medium and configured to execute one or more processors. Thus, examples of a unit may include components, such as software components, object-oriented software components, class components and task components, processes, functions, attributes, procedures, subroutines, segments of program code, drivers, firmware, microcode, circuitry, data, database, data structures, tables, arrays, and variables. The functionality provided in the components and units may be combined into fewer components and units or further separated into additional components and units.

Figure 1:
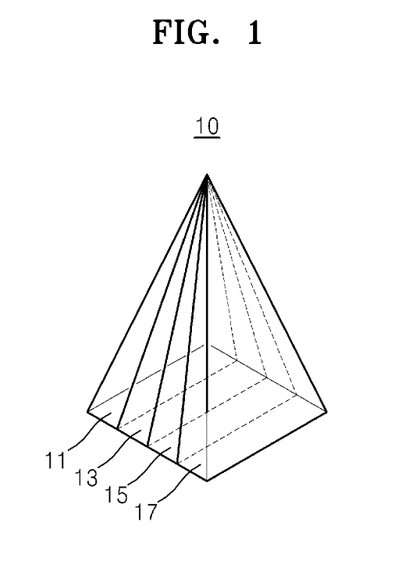
FIG. 1 illustrates a target body divided into a plurality of regions.

FIG. 1 illustrates a target body 10 divided into a plurality of regions, namely, first, second, third, and fourth regions 11, 13, 15, and 17.

The target body 10 used herein denotes blood flow in a human body, various organs of the human body, or a specific part of the human body, from which an ultrasonic image is to be acquired. Referring to FIG. 1, the target body 10 is divided into the first region 11, the second region 13, the third region 15, and the fourth region 17. Although the target body 10 is divided into the four regions 11, 13, 15, and 17 in FIG. 1, the number of regions into which the target body 10 is divided is not limited to 4.

In one of several methods of acquiring a volume image of the target body 10, a volume image for the entire target body 10 is generated at a time. However, the volume image generated according to this method has a low spatial resolution and a low temporal resolution.

In a method for improving the spatial resolution and the temporal resolution of a volume image, the target body 10 may be divided into the first, second, third, and fourth regions 11, 13, 15, and 17, and respective sub-volume images for the first, second, third, and fourth regions 11, 13, 15, and 17 may be connected to one another to generate the volume image of the target body 10.

Figure 2:
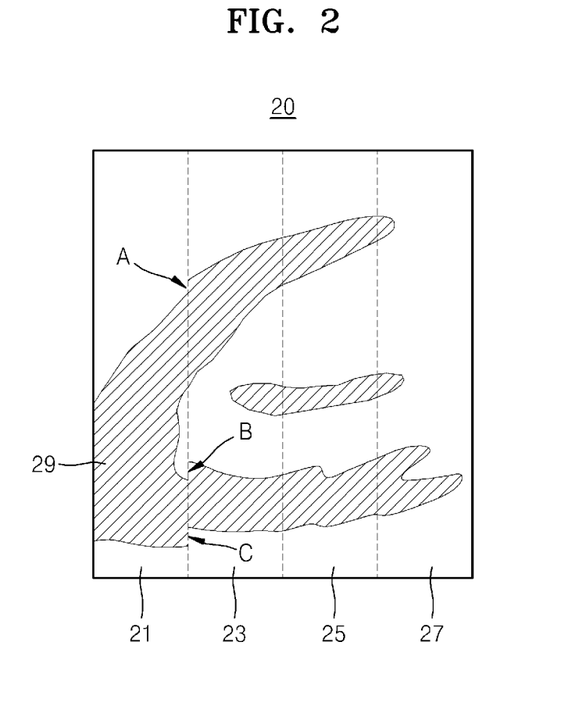
FIG. 2 illustrates a volume image generated according to a conventional volume image generating method.

FIG. 2 illustrates a volume image 20 generated according to a conventional volume image generating method. The volume image 20 includes an ultrasonic image 29 for a target body.

The volume image 20 is generated by connecting sub-volume images 21, 23, 25, and 27 respectively corresponding to a plurality of regions. However, the volume image 20 generated in this way may include stitch artifacts indicated by reference characters A, B, and C. The stitch artifacts A, B, and C may be formed by discontinuity between sectional images of every two adjacent ones of the sub-volume images 21, 23, 25, and 27. An examiner may not accurately inspect the target body 10 through the volume image 20 of FIG. 2.

Figure 3:
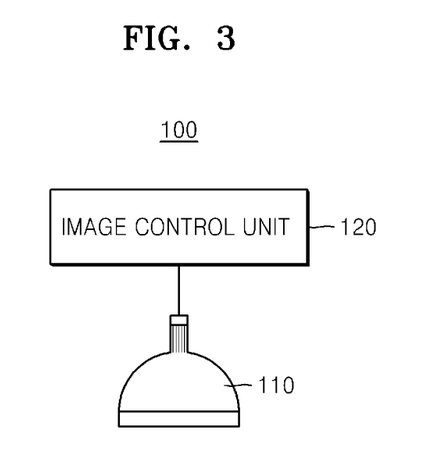
FIG. 3 is a configuration diagram of a volume image generating apparatus according to an embodiment of the present invention.

FIG. 3 is a configuration diagram of a volume image generating apparatus 100 according to an embodiment of the present invention.

Referring to FIG. 3, the volume image generating apparatus 100 may include a probe 110 and an image control unit 120. It will be apparent to one of ordinary skill in the art that the image control unit 120 may include a plurality of modules that perform a function of the image control unit 120.

The probe 110 includes a plurality of elements corresponding to piezoelectric elements, and the probe 110 transmits an ultrasonic signal to the target body 10 and receives a response signal reflected from the target body 10. The probe 110 of the volume image generating apparatus 100 may be a probe 110 for acquiring a three-dimensional (3D) image.

The probe 110 may transmit an ultrasonic signal to each of the first, second, third, and fourth regions 11, 13, 15, and 17 and may receive response signals respectively reflected from the first, second, third, and fourth regions 11, 13, 15, and 17.

The image control unit 120 generates a first sub-volume image corresponding to the first region 11 of the target body 10, based on the response signal reflected from the target body 10. The image control unit 120 also generates a second sub-volume image corresponding to the second region 13, which contacts the first region 11, based on the response signal reflected from the target body 10. The transmission of the ultrasonic signal and the reception of the response signal in the probe 110 may be performed every time each sub-volume image is generated.

When the target body 10 is a heart, the image control unit 120 may generate the first sub-volume image at a specific time point of an electrocardiogram (ECG) period and generate the second sub-volume image at a next specific time point of the ECG period. Accordingly, an error rate between sub-volume images may be reduced.

After the image control unit 120 generates the first sub-volume image corresponding to the first region 11 of FIG. 1, it generates the second sub-volume image corresponding to the second region 13 of FIG. 1 that contacts the first region 11.

The image control unit 120 connects the second sub-volume image to the first sub-volume image according to a location relationship between the first region 11 and the second region 13 of the target body 10.

Referring to FIG. 1, since the second region 13 is located on the right side of the first region 11, the image control unit 120 may connect the second sub-volume image to the right side of the first sub-volume image.

The image control unit 120 acquires a concordance rate between sectional images of the first and second sub-volume images that contact each other. Next, the image control unit 120 re-generates the second sub-volume image according to the concordance rate and connects the second sub-volume image to the first sub-volume image.

Figure 4:
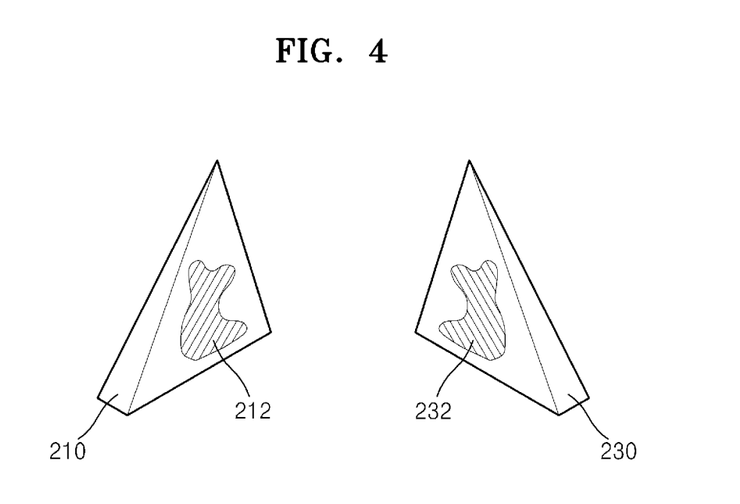
FIG. 4 illustrates a first sub-volume image and a second sub-volume image in the volume image generating apparatus illustrated in FIG. 3.

FIG. 4 illustrates a first sub-volume image 210 and a second sub-volume image 230 in the volume image generating apparatus 100 illustrated in FIG. 3.

The first sub-volume image 210 of FIG. 4 corresponds to the first region 11 of the target body 10 illustrated in FIG. 1, and the second sub-volume image 230 corresponds to the second region 13 of the target body 10.

As illustrated in FIG. 4, sections of the first and second sub-volume images 210 and 230 that are connected to each other include sectional images 212 and 232, respectively.

The image control unit 120 acquires a concordance rate between the sectional image 212 of the first sub-volume image 210 and the sectional image 232 of the second sub-volume image 230.

In detail, the image control unit 120 may acquire the concordance rate between the sectional images 212 and 232 of the first and second sub-volume images 210 and 230 that contact each other, by using a sum of squared differences (SSD), a correlation coefficient (CC), or mutual information (MI). Since the use of the SSD, the CC, and the MI in order to determine similarity between images is common in the art, a detailed description thereof is omitted.

When the concordance rate between the sectional image 212 of the first sub-volume image 210 and the sectional image 232 of the second sub-volume image 230 is less than a preset value, the image control unit 120 automatically re-generates the second sub-volume image 230. Alternatively, the image control unit 120 may show an examiner the concordance rate between the sectional image 212 of the first sub-volume image 210 and the sectional image 232 of the second sub-volume image 230, and may re-generate the second sub-volume image 230 under the control of the examiner.

On the other hand, when the concordance rate between the sectional image 212 of the first sub-volume image 210 and the sectional image 232 of the second sub-volume image 230 exceeds the preset value, the image control unit 120 generates a third sub-volume image corresponding to the third region 15 contacting the second region 13 and connects the third sub-volume image to the second sub-volume image. The image control unit 120 re-generates the third sub-volume image or generates a fourth sub-volume image, based on a concordance rate between sectional images of the third and second sub-volume images that contact each other.

In other words, when the target body 10 is divided into first through n-th regions, the volume image generating apparatus 100 of FIG. 3 sequentially generates respective sub-volume images of the first through n-th regions. When a concordance rate between a sectional image of a sub-volume image and that of a previous sub-volume image is less than a preset value, the volume image generating apparatus 100 of FIG. 3 does not generate a next sub-volume image but re-generates the current sub-volume image. Accordingly, stitch artifacts between sub-volume images may be removed, and a reliable volume image may be provided to the examiner.

Figure 5:
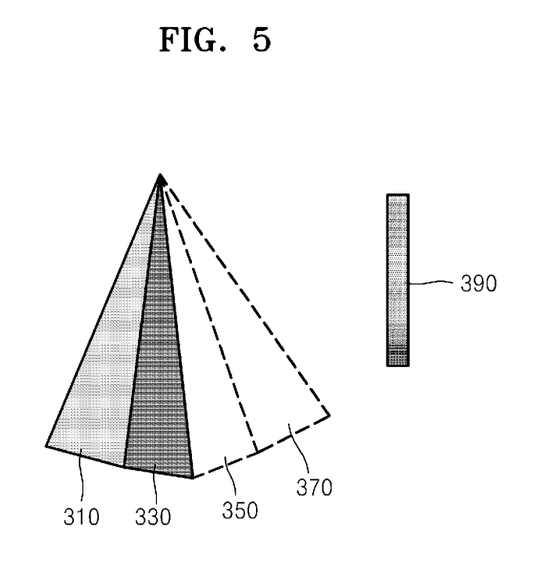
FIG. 5 illustrates a first figure corresponding to a first sub-volume image and a second figure corresponding to a second sub-volume image in the volume image generating apparatus illustrated in FIG. 3.

FIG. 5 illustrates a first FIG. 310 corresponding to a first sub-volume image and a second FIG. 330 corresponding to a second sub-volume image in the volume image generating apparatus 100 of FIG. 3.

The volume image generating apparatus 100 may show an examiner the progress of generation of the volume image of the target body 10 and a concordance rate between sectional images of sub-frames.

The volume image generating apparatus 100 may further include a display unit (not shown).

The display unit may display, to the examiner, a sub-volume image and a volume image generated by the image control unit 120. The display unit may also display the first FIG. 310 corresponding to the first sub-volume image generated by the image control unit 120 and may connect the second FIG. 330 corresponding to the second sub-volume image generated by the image control unit 120 to the first FIG. 310 according to the location relationship between the first region 11 and the second region 13 of the target body 10 and display the connected first and second FIGS. 310 and 330.

The first FIG. 310 of FIG. 5 corresponds to the first sub-volume image 210 of FIG. 4, and the second FIG. 330 corresponds to the second sub-volume image 230 of FIG. 4.

Before the third sub-volume image or the fourth sub-volume image is generated, the display unit does not display a third FIG. 350 corresponding to the third sub-volume image or a fourth FIG. 370 corresponding to the fourth sub-volume image and only displays the first and second FIGS. 310 and 330 of the already-generated first and second sub-volume images, thereby displaying the progress of generation of the volume image to a user.

The display unit may map the concordance rate between the sectional images of the first and second sub-volume images that contact each other with a color scale 390 and may display a result of the mapping on the second FIG. 330. In detail, the display unit may acquire a color corresponding to the concordance rate between the sectional images of the first and second sub-volume images that contact each other from the color scale 390, and may display the second FIG. 330 in the acquired color. The color scale 390 includes a plurality of colors corresponding to a plurality of concordance rates.

The examiner may check the color of a figure displayed on the display unit and can determine intuitively whether a sub-volume image corresponding to the figure should be re-produced or not.

Figure 6:
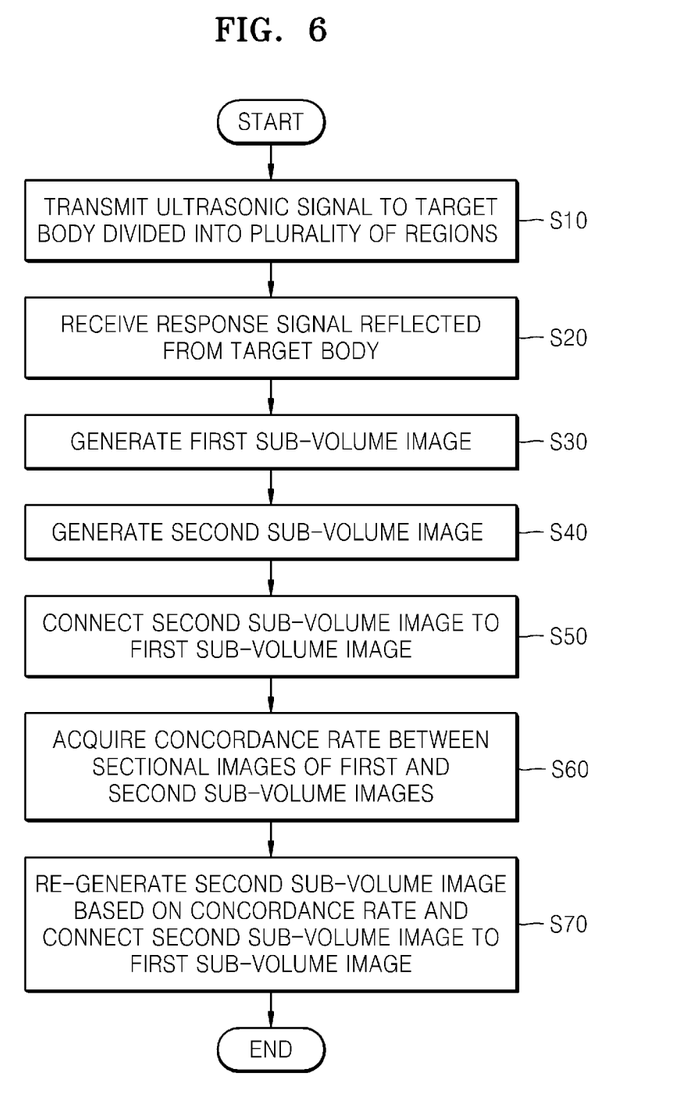
FIG. 6 is a flowchart of a volume image generating method according to an embodiment of the present invention.

FIG. 6 is a flowchart of a volume image generating method according to an embodiment of the present invention. Referring to FIG. 6, the volume image generating method includes operations sequentially performed by the volume image generating apparatus 100 of FIG. 3. Accordingly, the description given above with respect to the volume image generating apparatus 100 of FIG. 3 may also be applied to the volume image generating method of FIG. 6.

In operation S10, the volume image generating apparatus 100 transmits an ultrasonic signal to the target body 10 divided into the first, second, third, and fourth regions 11, 13, 15, and 17. The volume image generating apparatus 100 may transmit the ultrasonic signal to each of the first, second, third, and fourth regions 11, 13, 15, and 17, so the transmission is performed four times.

In operation S20, the volume image generating apparatus 100 receives a response signal reflected from the target body 10.

In operation S30, the volume image generating apparatus 100 generates a first sub-volume image corresponding to the first region 11 of the target body 10.

In operation S40, the volume image generating apparatus 100 generates a second sub-volume image corresponding to the second region 13 of the target body 10 contacting the first region 11.

In operation S50, the volume image generating apparatus 100 connects the second sub-volume image to the first sub-volume image according to a location relationship between the first region 11 and the second region 13 of the target body 10.

In operation S60, the volume image generating apparatus 100 acquires a concordance rate between sectional images of the first and second sub-volume images.

In operation S70, the volume image generating apparatus 100 re-generates the second sub-volume image based on the concordance rate between the sectional images of the first and second sub-volume images and connects the second sub-volume image to the first sub-volume image.

Figure 7:
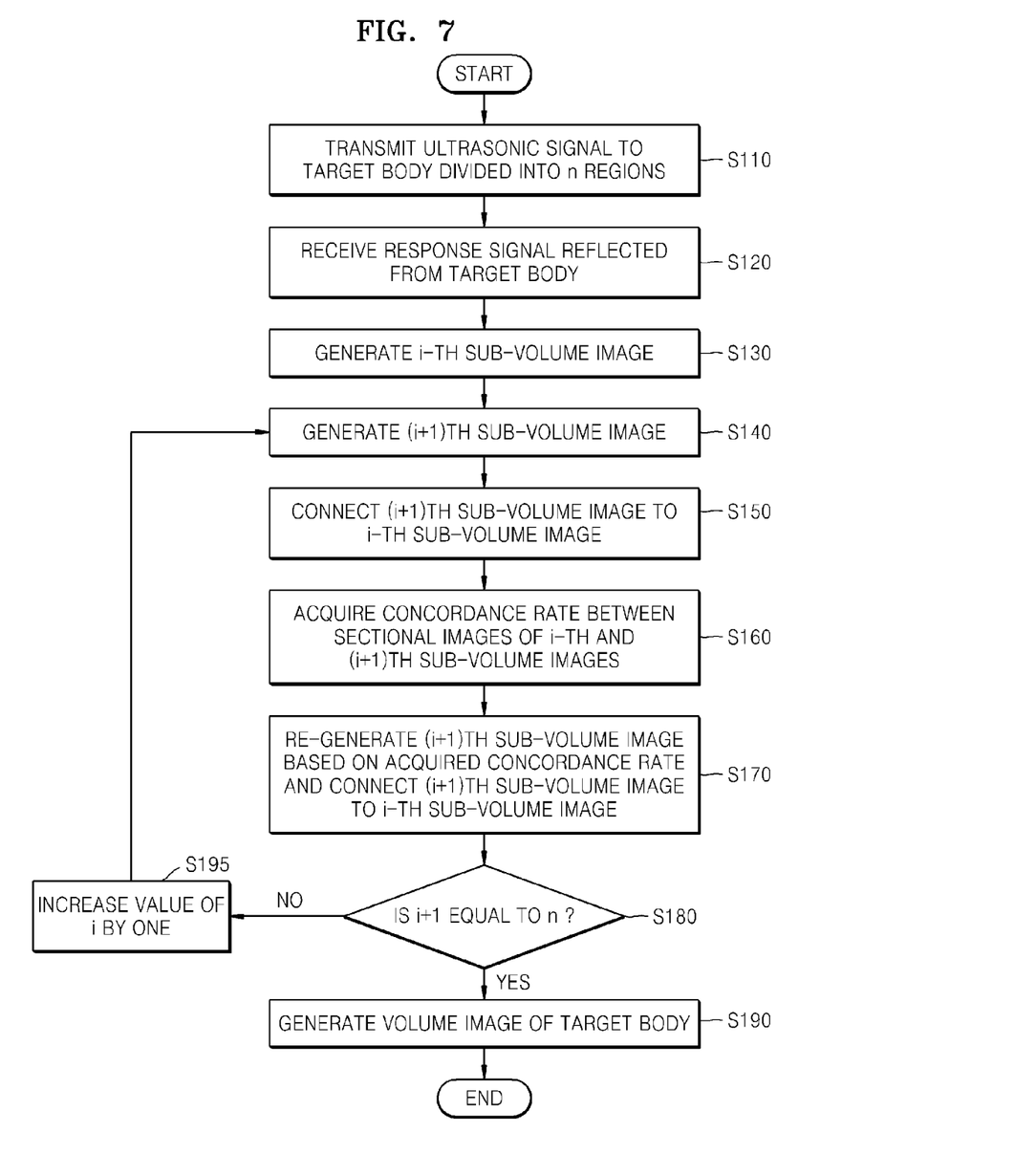
FIG. 7 is a flowchart of a volume image generating method according to another embodiment of the present invention.

FIG. 7 is a flowchart of a volume image generating method according to another embodiment of the present invention.

First, in operation S110, the volume image generating apparatus 100 divides the target body 10 into n (n denotes an integer greater than 1) regions and transmits an ultrasonic signal to the target body 10 divided into the n regions. Alternatively, the volume image generating apparatus 100 may transmit the ultrasonic signal to only an i-th (i denotes an integer ranging from 1 to n) region from among the n regions of the target body 10.

In operation S120, the volume image generating apparatus 100 receives a response signal reflected from the target body 10. Alternatively, the volume image generating apparatus 100 may receive a response signal reflected from the i-th region from among the n regions of the target body 10.

In operation S130, the volume image generating apparatus 100 generates an i-th sub-volume image corresponding to the i-th region.

Thereafter, in operation S140, the volume image generating apparatus 100 generates an (i+1)th sub-volume image. To generate the (i+1)th sub-volume image, the volume image generating apparatus 100 may perform a process of transmitting the ultrasonic signal to an (i+1)th region of the target body 10 and receiving a response signal reflected from the (i+1)th region.

In operation S150, the volume image generating apparatus 100 connects the (i+1)th sub-volume image to the i-th sub-volume image.

In operation S160, the volume image generating apparatus 100 acquires a concordance rate between sectional images of the i-th and (i+1)th sub-volume images.

In operation S170, the volume image generating apparatus 100 re-generates the (i+1)th sub-volume image based on the acquired concordance rate and connects the (i+1)th sub-volume image to the i-th sub-volume image. In detail, when the concordance rate between the sectional images of the i-th and (i+1)th sub-volume images is less than a preset value, the volume image generating apparatus 100 does not generate an (i+2)th sub-volume image but re-generates the (i+1)th sub-volume image.

In operation S180, the volume image generating apparatus 100 determines whether i+1 is equal to n. This corresponds to an ascertainment of whether the (i+1)th sub-volume image is a sub-volume image corresponding to the n-th region from among the n regions of the target body 10.

In operation S190, when i+1 is equal to n, the volume image generating apparatus 100 generates a volume image by connecting n sub-volume images respectively corresponding to the n regions of the target body 10.

In operation S195, when i+1 is not equal to n, the volume image generating apparatus 100 increases the value of i by one, and the method goes back to operation S140, in order to generate a sub-volume image corresponding to an (i+2)th region from among the n regions of the target body 10 and connect the generated sub-volume image to the (i+1)th sub-volume image.

The above-described embodiments of the present invention may be written as computer programs and may be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A volume image generating method comprising:
transmitting an ultrasonic signal to a target body divided into a plurality of regions and generating a first sub-volume image corresponding to a first region from among the plurality of regions of the target body, based on a response signal reflected from the target body;
generating a second sub-volume image corresponding to a second region contacting the first region from among the plurality of regions;
connecting the second sub-volume image to the first sub-volume image according to a location relationship between the first region and the second region of the target body; and
re-generating the second sub-volume image based on a concordance rate between sectional images of the first and second sub-volume images that contact each other, and connecting the re-generated second sub-volume image to the first sub-volume image.

2. The volume image generating method of claim 1, further comprising, when the concordance rate between the sectional images of the first and second sub-volume images that contact each other exceeds a preset value, generating a third sub-volume image corresponding to a third region contacting the second region from among the plurality of regions of the target body and connecting the third sub-volume image to the re-generated second sub-volume image.

3. The volume image generating method of claim 1, wherein the connecting of the re-generated second sub-volume image to the first sub-volume image comprises automatically re-generating the second sub-volume image when the concordance rate is less than a preset value.

4. The volume image generating method of claim 1, further comprising generating sub-volume images respectively corresponding to the plurality of regions and connecting the sub-volume images to one another to generate a volume image of the target body.

5. The volume image generating method of claim 1, wherein the connecting of the re-generated second sub-volume image to the first sub-volume image comprises acquiring the concordance rate between the sectional images of the first and second sub-volume images that contact each other, by using a SSD, a CC, or MI.

6. The volume image generating method of claim 1, further comprising:
   displaying a first figure corresponding to the generated first sub-volume image; and
   connecting a second figure corresponding to the generated second sub-volume image to the first figure according to a location relationship between the first region and the second region of the target body and displaying the connected first and second figures.

7. The volume image generating method of claim 6, further comprising mapping the concordance rate between the sectional images of the first and second sub-volume images that contact each other with a color scale and displaying a result of the mapping on the second figure.

8. A volume image generating apparatus comprising:
   a probe which transmits an ultrasonic signal to a target body divided into a plurality of regions and receives a response signal reflected from the target body; and
   an image control unit which generates a first sub-volume image and a second sub-volume image corresponding respectively to a first region and a second region contacting the first region, from among the plurality of regions based on the response signal, and connects the second sub-volume image to the first sub-volume image according to a location relationship between the first region and the second region,
   wherein the image control unit re-generates the second sub-volume image based on a concordance rate between sectional images of the first and second sub-volume images that contact each other, and connects the re-generated second sub-volume image to the first sub-volume image.

9. The volume image generating apparatus of claim 8, wherein, when the concordance rate between the sectional images of the first and second sub-volume images that contact each other exceeds a preset value, the image control unit generates a third sub-volume image corresponding to a third region contacting the second region from among the plurality of regions and connects the third sub-volume image to the re-generated second sub-volume image.

10. The volume image generating apparatus of claim 8, wherein the image control unit generates sub-volume images respectively corresponding to the plurality of regions and connects the sub-volume images to one another to generate a volume image of the target body.

11. The volume image generating apparatus of claim 8, wherein, when the concordance rate is less than a preset value, the image control unit automatically re-generates the second sub-volume image.

12. The volume image generating apparatus of claim 8, wherein the image control unit acquires the concordance rate between the sectional images of the first and second sub-volume images that contact each other, by using a SSD, a CC, or MI.

13. The volume image generating apparatus of claim 8, further comprising a display unit which displays a first figure corresponding to the generated first sub-volume image, connects a second figure corresponding to the generated second sub-volume image to the first figure according to a location relationship between the first region and the second region, and displays the connected first and second figures.

14. The volume image generating apparatus of claim 13, wherein the display unit maps the concordance rate between the sectional images of the first and second sub-volume images that contact each other with a color scale and displays a result of the mapping on the second figure.

15. A computer-readable recording medium having recorded thereon a program for executing the volume image generating method of claim 1.

* * * * *